United States Patent
Li et al.

(10) Patent No.: US 12,523,877 B2
(45) Date of Patent: Jan. 13, 2026

(54) POSITIONING METHOD, APPARATUS, ELECTRONIC DEVICE, HEAD-MOUNTED DISPLAY DEVICE, AND STORAGE MEDIUM

(71) Applicant: BEIJING ZITIAO NETWORK TECHNOLOGY CO., LTD., Beijing (CN)

(72) Inventors: Hanzhen Li, Beijing (CN); Junliang Shan, Beijing (CN); Qinglin Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 18/324,093

(22) Filed: May 25, 2023

(65) Prior Publication Data

US 2023/0418072 A1    Dec. 28, 2023

(30) Foreign Application Priority Data

Jun. 24, 2022   (CN) .......................... 202210729298.4

(51) Int. Cl.
```
G09G 5/00        (2006.01)
G02B 27/01       (2006.01)
G06F 3/01        (2006.01)
```
(52) U.S. Cl.
CPC .......... *G02B 27/0172* (2013.01); *G06F 3/014* (2013.01); *G06F 3/017* (2013.01); *G02B 2027/0138* (2013.01); *G02B 2027/014* (2013.01)

(58) Field of Classification Search
CPC .......... G06F 3/011; G06F 3/014; G06F 3/017; G02B 27/0172
USPC ............................................................ 345/8
See application file for complete search history.

(56) References Cited

U.S. PATENT DOCUMENTS

| | | | |
|---|---|---|---|
| 2020/0193638 A1* | 6/2020 | Taylor | G06T 7/75 |
| 2021/0241529 A1* | 8/2021 | Cowburn | G06F 3/011 |
| 2021/0397126 A1* | 12/2021 | Hornstein | G06F 3/012 |
| 2022/0043270 A1 | 2/2022 | Zhang | |
| 2022/0206566 A1* | 6/2022 | Senkal | G06T 7/70 |
| 2023/0041519 A1* | 2/2023 | Huang | G06F 3/0308 |
| 2023/0350489 A1* | 11/2023 | Butcher | G06T 13/40 |

FOREIGN PATENT DOCUMENTS

CN    109613983 A    4/2019

* cited by examiner

*Primary Examiner* — Jonathan M Blancha

(57) ABSTRACT

The disclosure relates to a positioning method, apparatus, electronic device, head-mounted display device, and storage medium. The method is suitable for a head-mounted display device. The method determines a target joint point when a tracking target enters a tracking blind zone; the target joint point referring to a joint point in a wearer's body that supports the tracking target to move within the tracking blind zone; determining position information of the target joint point at current moment; determines relative positional relationship information between the target joint point and the tracking target at the current moment; and determines the position information of the tracking target at the current moment, based on the position information of the target joint point at the current moment and the relative positional relationship information at the current moment.

17 Claims, 3 Drawing Sheets

POSITIONING METHOD, APPARATUS, ELECTRONIC DEVICE, HEAD-MOUNTED DISPLAY DEVICE, AND STORAGE MEDIUM

CROSS REFERENCE

This application claims the benefit of and priority from CN Patent Application Serial No. 202210729298.4 filed Jun. 24, 2022, entitled "A POSITIONING METHOD, APPARATUS, ELECTRONIC DEVICE, HEAD-MOUNTED DISPLAY DEVICE, AND STORAGE MEDIUM" incorporated herein by reference in its entirety.

TECHNICAL FIELD

The present disclosure relates to the field of positioning technology, and in particular, to a positioning method, apparatus, electronic device, head-mounted display device, and storage medium.

BACKGROUND

With the vigorous development of the virtual reality industry in recent years, the demand for interaction is increasing. Capturing hand movements is a very core content for interactive experience. Currently popular motion capture methods include inertial sensor based motion capture method, vision based motion capture method, and ultrasound based motion capture method.

SUMMARY

In order to solve the above technical problems or at least in part solve the above technical problems, the present disclosure provides a positioning method, apparatus, electronic device, head-mounted display device and storage medium.

In a first aspect, the present disclosure provides a positioning method suitable for a head-mounted display device, the method comprising:
  determining a target joint point when a tracking target enters a tracking blind zone; the target joint point referring to a joint point in a wearer's body that supports the tracking target to move within the tracking blind zone;
  determining position information of the target joint point at current moment;
  determining relative positional relationship information between the target joint point and the tracking target at the current moment; and
  determining the position information of the tracking target at the current moment, based on the position information of the target joint point at the current moment and the relative positional relationship information at the current moment.

In a second aspect, the present disclosure further provides a positioning apparatus suitable for a head-mounted display device, the apparatus comprising:
  a first determination module configured to determine a target joint point when a tracking target enters a tracking blind zone; the target joint point referring to a joint point in a wearer's body that supports the tracking target to move within the tracking blind zone;
  a second determination module configured to determine position information of the target joint point at current moment;
  a third determination module configured to determine relative positional relationship information between the target joint point and the tracking target at the current moment; and
  a fourth determination module configured to determine the position information of the tracking target at the current moment, based on the position information of the target joint point at the current moment and the relative positional relationship information at the current moment.

In a third aspect, the present disclosure further provides an electronic device, the electronic device comprising:
  one or more processors;
  a storage for storing one or more programs;
  when executed by the one or more processors, the one or more programs cause the one or more processors to implement the positioning method as described above.

In a fourth aspect, a head-mounted display device comprises the positioning apparatus as described above or the electronic device as described above.

In a fifth aspect, the present disclosure further provides a computer-readable storage medium having a computer program stored thereon, which, when executed by a processor, implement the positioning method as described above.

The essence of the technical solution provided by the embodiments of the present disclosure is to provide a new method for determining position information of a tracking target by following settings: determining a target joint point when a tracking target enters a tracking blind zone; the target joint point referring to a joint point in a wearer's body that supports the movement of the tracking target within the tracking blind zone; determining position information of the target joint point at current moment; determining relative positional relationship information between the target joint point and the tracking target at the current moment; and determining the position information of the tracking target at the current moment, based on the position information of the target joint point at the current moment and the relative positional relationship information at the current moment.

BRIEF DESCRIPTION OF THE DRAWINGS

The accompanying drawings incorporated in and constituting a part of this specification illustrate embodiments consistent with the disclosure and serve to explain the principles of the disclosure along with the description.

In order to more clearly illustrate the technical solutions in the embodiments of the present disclosure or the related art, the following will briefly introduce the drawings that need to be used in the description of the embodiments or the related art. Apparently, for those of ordinary skill in the art, other drawings can also be obtained from these drawings without making creative labor.

DETAILED DESCRIPTION

Figure 1:
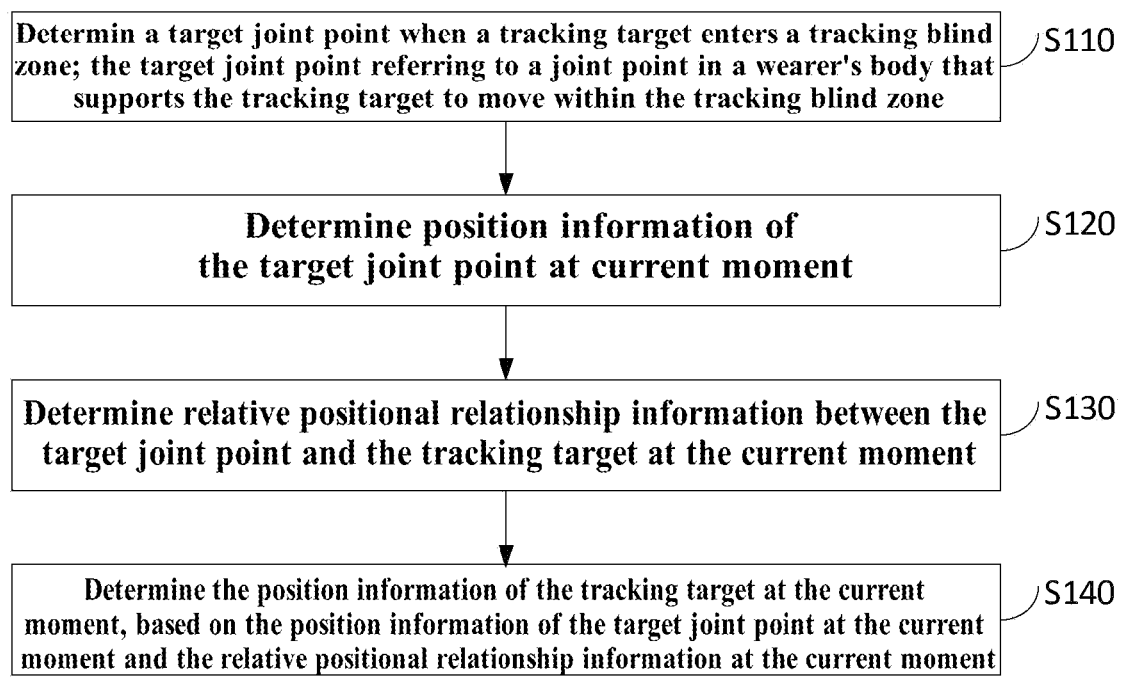
FIG. 1 is a flowchart of a positioning method provided by one or more embodiments of the present disclosure.

In order to more clearly understand the above objectives, features and advantages of the present disclosure, the solutions of the present disclosure will be further described below. It should be noted that, the embodiments of the present disclosure and the features in the embodiments can be combined with each other in case of no conflict.

In the following description, many specific details are set forth in order to fully understand the present disclosure, but the present disclosure can also be implemented in other ways than described here; apparently, the embodiments in the description are only part of the embodiments of the present disclosure, and not all of the embodiments.

With the vigorous development of the virtual reality industry in recent years, the demand for interaction is increasing. Capturing hand movements is a very core content for interactive experience. Currently popular motion capture methods include inertial sensor based motion capture method, vision based motion capture method, and ultrasound based motion capture method.

However, in practice, the vision based motion capture method and the ultrasonic based motion capture method are limited by the Field Of View (FOV), and there are tracking blind zones. Once a user's hand exceeds the tracking range of a camera or an ultrasonic transmitter, it enters a tracking blind zone and cannot perform motion capture based on vision or ultrasonic. While the inertial sensor based motion capture method can only provide precise posture information, but cannot provide precise position information. Therefore, when a user's hand enters a tracking blind zone, how to precisely locate the user's hand is an urgent problem to be solved at present.

Virtual reality devices refer to terminals that realize virtual reality effects, and may usually be provided in the form of glasses, Head Mount Displays (HMDs), and contact lenses for visual perception and other forms of perception. Of course, the forms of virtual reality device implementations are not limited to these, and may be further miniaturized or upsized as necessary.

It is often necessary to set up a positioning system in a virtual reality device to meet the demand for human-computer interaction. The main task of the positioning system (including locator and positioning technology) is to provide the position, direction, and displacement information of a tracking target in a three-dimensional reality space to a virtual reality system in a high-precision, low-latency, and low-computational complexity manner, and then display in a virtual space. The tracking target refers to a object used to interact with a virtual reality device, such as a hand and foot of a user of the virtual reality device, and a controller held by the user of the virtual reality device.

At present, the main tracking target positioning technology is to measure distance and locate objects using cameras, ultrasonic sensors, and inertial sensors and the like.

Inertial sensors include gyroscopes, angular velocity meters, accelerometers, gravity sensors, etc. An accelerometer can measure the magnitude and direction of the three-axis acceleration; a magnetometer can measure the direction and current distance and orientation, that is, the angle with each positive direction of the east, west, north, and south; a gyroscope can measure the rotation angle of the device itself; a gravity sensor completes the conversion from gravity changes to electrical signals. Fixing the inertial sensor on a tracking target during positioning can measure the motion physical quantity of the tracking target, such as acceleration, angular velocity, etc., and then performing double integration on the acceleration obtains the displacement of the tracking target, and performing integration on the angular velocity obtains the motion direction of the tracking target, and finally combined with the initial position of the tracking target, the position of the tracking target can be calculated.

However, using the inertial sensor alone to locate the tracking target needs to know the initial posture of the tracking target, and there is a cumulative error when using the acceleration and angular velocity to solve the displacement and direction. Therefore, in practice, it is only used for direction measurement.

At present, the location positioning of a tracking target is mainly realized by means of cameras or ultrasonic sensors. The cameras or ultrasonic sensors, however, are extremely easily limited by the Field Of View (FOV), and there are tracking blind zones. If the tracking target enters a final blind zone, it will not be able to precisely capture the precise position of the tracking target.

In view of this, FIG. 1 is a flowchart of a positioning method provided by one or more embodiments of the present disclosure. The embodiments are applicable to the situation of capturing user hand motions. The method can be executed by a positioning apparatus, which can be implemented in the form of software and/or hardware, and which can be configured in an electronic device, such as a virtual reality device. Specifically, the virtual reality device is a head-mounted display device.

As shown in FIG. 1, the method may specifically comprise:

S110: Determining a target joint point when a tracking target enters a tracking blind zone; the target joint point referring to a joint point in a wearer's body that supports the tracking target to move within the tracking blind zone.

The tracking target refers to a object used to interact with a virtual reality device, such as a hand and foot of a user of the virtual reality device, and a controller held by the user of the virtual reality device.

The tracking blind zone refers to a range that cannot be tracked when the position of the tracking target is determined based on vision or ultrasound etc., which is determined by the field of view angle of a camera or an ultrasonic generator. In practice, there may be one or more tracking blind zones in 3D space. This application does not limit the position of the tracking blind zone relative to the virtual reality device.

The target joint point refers to a joint point in a wearer's body that supports the movement of the tracking target in the tracking blind zone. Here, "support" means that the tracking target can be kept moving in the tracking blind zone, and during the process of moving of the tracking target in the tracking blind zone, the moving distance of the target joint point is less than or equal to a set distance threshold. The moving distance of the target joint point being less than or equal to the set distance threshold means that the target joint point tends to stay still.

For example, if the tracking target is a wearer's hand or a controller held by the hand, a tracking blind zone is located directly in front of the wearer's head of the head-mounted display device. When the hand moves in the tracking blind zone, the moving distance of the wrist is usually less than or equal to a set distance threshold, so the wrist is determined as a target joint point. For another example, if the tracking target is the wearer's hand or the controller held by the hand, the tracking blind zone is located behind the side of the wearer's head of the head-mounted display device. For example, If the wearer is conducting actions such as throwing a grenade or drawing a bow and shooting an arrow, when the hand moves in the tracking blind zone, the moving distance of the elbow is usually less than or equal to the set distance threshold, so the elbow is determined as a target joint point.

In one or more embodiments, the association relationship between each tracking blind zone and joint points is pre-built, for example, a tracking blind zone located directly in front of a wearer's head of a head-mounted display device has an association relationship with the wrist. A tracking blind zone located behind the side of the wearer's head of the head-mounted display device has an association relationship with the elbow. When this step is performed, joint points having an association relationship with tracking blind zones are determined as target joint points.

It should be emphasized that if there are multiple tracking blind zones in the three-dimensional space, it is necessary to determine which tracking blind zone the tracking target enters before determining the target joint point. There are many methods for determining which tracking blind zone a tracking target enters, which is not limited in this application. Since position information of the tracking target will be lost after the tracking target enters the tracking blind zone, the tracking blind zone into which the tracking target enters is determined based on the last determined position information of the tracking target before the position information of the tracking target is lost. In one or more embodiments, taking the last determined position of the tracking target before the position information of the tracking target is lost as a reference position, the tracking blind zone closest to the reference position is determined as the tracking blind zone into which the tracking target enters.

In another embodiment, after a tracking target enters a tracking blind zone, position information of the tracking target is determined by using the data collected by an inertial sensor; based on the position information of the tracking target and boundary information of the tracking blind zone, the tracking blind zone into which the tracking target enters is determined. It should be noted that, although the position information of the tracking target determined by means of the inertial sensor alone is not precise enough, since the determination of the tracking blind zone into which the tracking target enters has low requirements on the precise of the position information of the tracking target, it is possible to determine the tracking blind zone into which the tracking target enters by means of the inertial sensors alone.

S120: Determining position information of the target joint point at current moment.

The position information of the target joint point may be a vector of the position of a target joint point in a three-dimensional space, that is, a space vector pointing from the origin of the three-dimensional coordinate system to the target joint point in the three-dimensional space. In some embodiments, the three-dimensional coordinate system constructed in the three-dimensional space is a world coordinate system.

There are many specific implementation methods for this step, which are not limited in this application. Exemplarily, if a target joint point is located outside a tracking blind zone, the implementation method for this step comprises: determining position information of a target joint point at current moment based on information collected by a camera or an ultrasonic sensor on the target joint point at the current moment.

If a target joint point is located within a tracking blind zone, and/or, the target joint point is located outside the tracking blind zone, the implementation method for this step comprises: obtaining position information of a target joint point at an initial moment; the initial moment being any moment within a preset time period with the moment when the tracking target enters the tracking blind zone as the starting point; using the position information of the target joint point at the initial moment as the position information of the target joint point at the current moment. The moment when the tracking target enters the tracking blind zone is the moment when detecting the loss of the position information of the tracking target for the first time.

Exemplarily, the position information of the tracking target is lost at moment t1, and the preset time length is set as t0, then any moment between t1 and t1+t0 may be determined as the initial moment. That is, the position information of the target joint point at any moment between t1 and t1+t0 is taken as the position information of the target joint point at the current moment.

Since the target joint point tends to stay still when the tracking target is moving in the tracking blind zone, the position information of the target joint point at the initial moment can be used as the position information of the target joint point at the current moment, in this way, it can reduce the difficulty of determining the position information of the target joint point at the current moment.

In practice, there are many methods for obtaining position information of a target joint point at an initial moment, which are not limited in this application. Exemplarily, if a target joint point does not enter a tracking blind zone at an initial moment, the method for obtaining the position information of the target joint point at the initial moment comprises: determining position information of the target joint point at the initial moment based on information collected by a camera or an ultrasonic sensor on the target joint point at the initial moment.

If a target joint point enters a tracking blind zone at an initial moment, the method for obtaining position information of the target joint point at the initial moment comprises: obtaining position information and posture information of the tracking target at the initial moment; determining the position information of the target joint point at the initial moment based on the position information and the posture information of the tracking target at the initial moment. Wherein, the position information and the posture information of the tracking target at the initial moment are obtained by using the data collected by an inertial sensor.

Those skilled in the art can understand that a tracking target can move relative to a target joint point, although the tracking target is in different postures during the movement of the tracking target, and the distance between the tracking target and the target joint point is not the same. However, due to ergonomic principles, when the posture of the tracking target is determined, the relative positional relationship between the target joint point and the tracking target is determined. Here, the relative positional relationship between the target joint point and the tracking target includes the distance between the target joint point and the tracking target, and orientation information of the target joint point relative to the tracking target. Alternatively, the relative positional relationship between the target joint point and the tracking target includes the distance between the target joint point and the tracking target, and orientation information of the tracking target relative to the target joint point.

In some embodiments, the correspondence relationship between relative position information between a tracking target and a target joint point and the posture of the tracking target can be constructed in advance. When performing the step of "determining position information of the target joint point at the initial moment based on the position information and posture information of the tracking target at the initial moment", based on the posture information of the tracking target at the initial moment, the relative position information between the target joint point and the tracking target at the initial moment is determined; based on the position information of the tracking target at the initial moment and the relative position information between the target joint point and the tracking target at the initial moment, the position information of the target joint point at the initial moment is determined.

It should be emphasized that, although there is a cumulative error when the inertial sensor is used alone to locate the tracking target, the shorter the duration of the tracking target using the inertial sensor alone, the smaller the cumulative error. Therefore, if the position information of the target joint point at the initial moment is determined based on the position information and posture information of the tracking target at the initial moment, when determining t0, it is necessary to ensure that the error caused by using the inertial sensor alone for location positioning is within a permissible range of error.

S130: Determining relative positional relationship information between the target joint point and the tracking target at the current moment.

The relative positional relationship information between the target joint point and the tracking target refers to information that can describe the orientation and distance of the tracking target relative to the target joint point, or the relative positional relationship information between the target joint point and the tracking target refers to information that can describe the orientation and distance of the target joint point relative to the tracking target. Exemplarily, the relative positional relationship information between the target joint point and the tracking target includes a space vector pointing from the target joint point to the tracking target in the three-dimensional coordinate system constructed in the three-dimensional space.

S140: Determining the position information of the tracking target at the current moment, based on the position information of the target joint point at the current moment and the relative positional relationship information at the current moment.

The position information of the tracking target may be a vector of the position of a tracking target in a three-dimensional space, that is, a space vector pointing from the origin of the three-dimensional coordinate system to the tracking target in the three-dimensional space.

There are many specific implementation methods for this step, which are not limited in this application. Exemplarily, if position information of a target joint point at current moment is a space vector pointing from the origin of a three-dimensional coordinate system to the target joint point in the three-dimensional space at the current moment, and relative positional relationship information between the target joint point and the tracking target at the current moment is a space vector from the target joint point to the tracking target in the three-dimensional space, adding the two can obtain the position information of the tracking target at the current moment.

In another embodiment, an error correction amount can be set. When this step is performed, the position information of the tracking target at the current moment is determined based on the position information of the target joint point at the current moment, the relative positional relationship information at the current moment, and the error correction amount. There are many methods for determining the error correction amount, which are not limited in this application.

The essence of the technical solution above is to provide a new method for determining position information of a tracking target by following settings: determining a target joint point when a tracking target enters a tracking blind zone; the target joint point referring to a joint point in a wearer's body that supports the movement of the tracking target within the tracking blind zone; determining position information of the target joint point at current moment; determining relative positional relationship information between the target joint point and the tracking target at the current moment; and determining the position information of the tracking target at the current moment, based on the position information of the target joint point at the current moment and the relative positional relationship information at the current moment. The method, due to the step of obtaining the displacement of the tracking target without involving performing double integration on acceleration or only performing double integration on acceleration in an extremely short time period, can significantly reduce cumulative drift, thereby achieving the purpose of improving the accuracy of the position information of the tracking target.

On the basis of the above technical solution, in some embodiments, S130 comprises: acquiring posture information of the tracking target at current moment; determining a correction amount for the relative positional relationship based on the posture information of the tracking target at the current moment and the posture information of the tracking target at the initial moment; determining relative positional relationship information between the target joint point and the tracking target at the current moment based on the correction amount and the relative positional relationship information between the target joint point and the tracking target at the initial moment.

Figure 2:
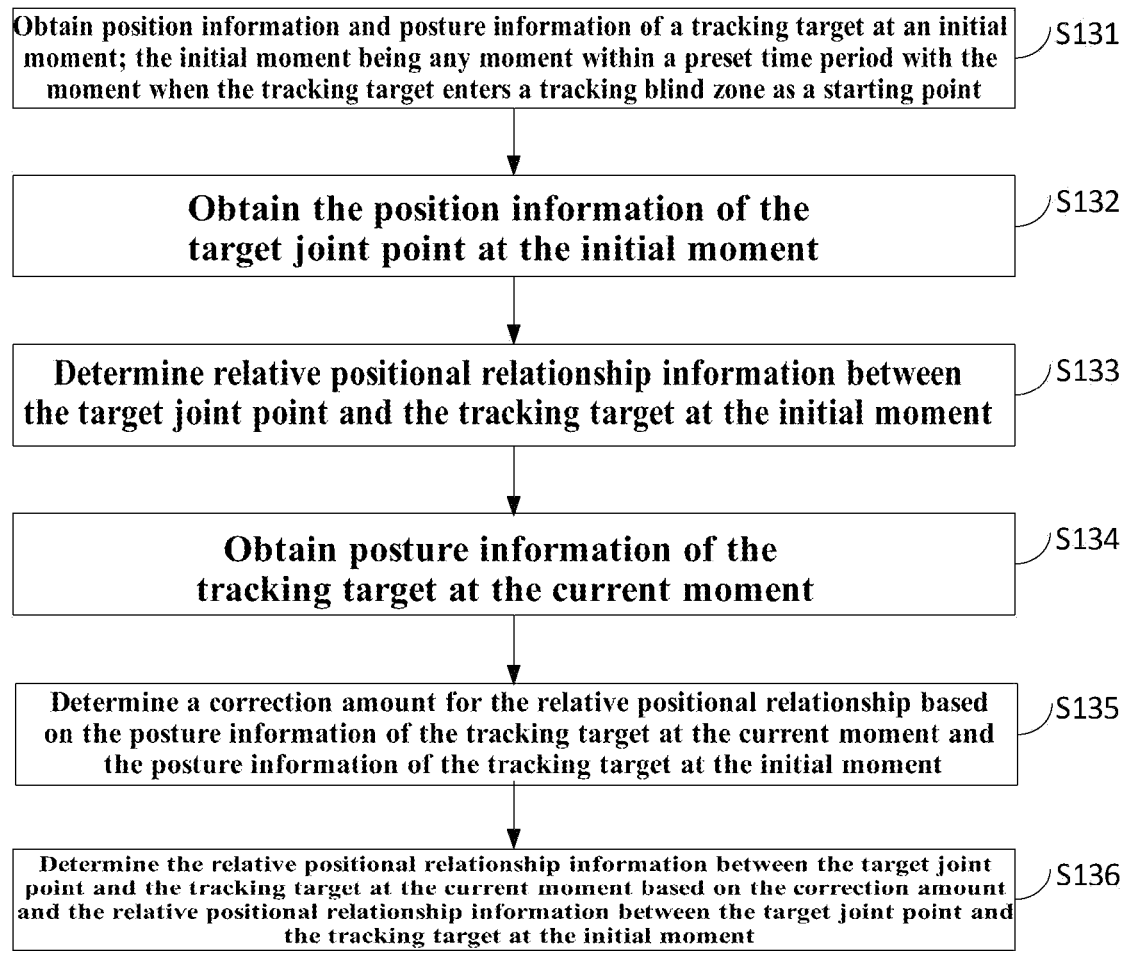
FIG. 2 is a flowchart of a method for implementing S130 provided by one or more embodiments of the present disclosure.

FIG. 2 is a flowchart of a method for implementing S130 provided by one or more embodiments of the present disclosure. Referring to FIG. 2, the method comprises:

S131: Obtaining position information and posture information of a tracking target at an initial moment; the initial moment being any moment within a preset time period with the moment when the tracking target enters a tracking blind zone as the starting point.

The moment when the tracking target enters the tracking blind zone is the moment when detecting the loss of the position information of the tracking target for the first time. Exemplarily, the position information of the tracking target is lost at moment t1, and the preset time length is set as t0, then any moment between t1 and t1+t0 may be determined as the initial moment. That is, the position information of the target joint point at any moment between t1 and t1+t0 is taken as the position information of the target joint point at the current moment.

The position information and posture information of the tracking target at the initial moment can be obtained based on the data collected by an inertial sensor fixed with the tracking target.

Although there is a cumulative error when the inertial sensor is used alone to locate the tracking target, the shorter the duration of the tracking target using the inertial sensor alone, the smaller the cumulative error. Therefore, when determining t0, it is necessary to ensure that the error caused by using the inertial sensor alone for location positioning is within a permissible range of error.

S132: Obtaining the position information of the target joint point at the initial moment.

In practice, there are many methods for obtaining the position information of the target joint point at the initial moment, which are not limited in this application. Exemplarily, if the target joint point does not enter a tracking blind zone at the initial moment, the method for obtaining the position information of the target joint point at the initial moment comprises: determining position information of the target joint point at the initial moment based on information collected by a camera or an ultrasonic sensor on the target joint point at the initial moment.

If the target joint point enters the tracking blind zone at the initial moment, the method for obtaining the position information of the target joint point at the initial moment comprises: determining the position information of the target joint point at the initial moment based on the position information and the posture information of the tracking target at the initial moment.

Those skilled in the art can understand that a tracking target can move relative to a target joint point, although the tracking target is in different postures during the movement of the tracking target, and the distance between the tracking target and the target joint point is not the same. However, due to ergonomic principles, when the posture of the tracking target is determined, the relative positional relationship between the target joint point and the tracking target is determined. Here, the relative positional relationship between the target joint point and the tracking target includes the distance between the target joint point and the tracking target, and orientation information of the target joint point relative to the tracking target. Alternatively, the relative positional relationship between the target joint point and the tracking target includes the distance between the target joint point and the tracking target, and orientation information of the tracking target relative to the target joint point.

In some embodiments, the correspondence relationship between the distance between the tracking target and the target joint point and the posture of the tracking target can be constructed in advance. When performing this step, based on posture information of the tracking target at the initial moment, the relative position information between the target joint point and the tracking target at the initial moment is determined; based on the position information of the tracking target at the initial moment and the relative position information between the target joint point and the tracking target at the initial moment, the position information of the target joint point at the initial moment is determined.

S133: Determining relative positional relationship information between the target joint point and the tracking target at the initial moment.

There are many methods for implementing this step, which are not limited in this application. Exemplarily, if the step of determining the relative positional relationship information between the target joint point and the tracking target at the initial moment is not involved in the process of performing S132, for example, if the position information of the target joint point at the initial moment is a space vector pointing from the origin of a three-dimensional coordinate system to the target joint point in a three-dimensional space at the initial moment, and the position information of the tracking target at the initial moment is a space vector pointing from the origin of the three-dimensional coordinate system to the tracking target in the three-dimensional space at the initial moment, then subtracting the two can obtain a space vector pointing from the target joint point to the tracking target at the initial moment, that is, the relative positional relationship information of the target joint point and the tracking target at the initial moment.

If the step of determining the relative positional relationship information between the target joint point and the tracking target at the initial moment is involved in the process of performing S132, this step does not need to be performed again.

S134: Obtaining posture information of the tracking target at the current moment.

The posture information of the tracking target at the current moment can be obtained based on processing the data collected by the inertial sensor bound to the tracking target.

S135: Determining a correction amount for the relative positional relationship based on the posture information of the tracking target at the current moment and the posture information of the tracking target at the initial moment;

In some embodiments, a functional relationship is pre-built with the correction amount for the relative positional relationship as a dependent variable, and the posture information of the tracking target at a first moment and the posture information of the tracking target at a second moment as independent variables. When performing this step, using the posture information of the tracking target at the current moment as the posture information of the tracking target at the second moment, and using the posture information of the tracking target at the initial moment as the posture information of the tracking target at the first moment, and bringing them into this functional relationship, the correction amount for the relative positional relationship can be obtained.

S136: Determining the relative positional relationship information between the target joint point and the tracking target at the current moment based on the correction amount and the relative positional relationship information between the target joint point and the tracking target at the initial moment.

There are many methods for implementing this step, which are not limited in this application. Exemplarily, if the correction amount and the relative positional relationship information between the target joint point and the tracking target at the initial moment can both be expressed as space vectors in the same three-dimensional space, the implementation method for this step comprises adding the correction amount with the relative positional relationship information between the target joint point and the tracking target at the initial moment to obtain the relative positional relationship information between the target joint point and the tracking target at the current moment. Alternatively, the implementation method for this step comprises multiplying the correction amount by the relative positional relationship information between the target joint point and the tracking target at the initial moment to obtain the relative positional relationship information between the target joint point and the tracking target at the current moment.

In one or more embodiments, if a tracking target exceeds the field of view range of a camera or an ultrasonic sensor at time t1, after entering a tracking blind zone, position information and posture information of the tracking target are determined based on the data collected by an inertial sensor. If the tracking target exits the tracking blind zone before reaching the moment t1+t0, and enters the field of view range of the camera or the ultrasonic sensor again, after that, within the field of view range, the position information of the tracking target is determined based on the data collected by the camera or the ultrasonic sensor; the posture information of the tracking target is determined based on the data collected by the inertial sensor. If when reaching the moment t1+t0, the tracking target has never entered the field of view range of the camera or the ultrasonic sensor again, that is, during the time period from t1 to t1+t0, the tracking target is always in the tracking blind zone, taking the moment t1+t0 as the initial moment, recording position information and posture information of the tracking target at the initial moment, denoted as $(T_1, Q_1)$. Wherein, $T_1$ is a three-dimensional space vector of the tracking target position at the initial moment, and $Q_1$ is a quaternion of posture of the tracking target at the initial moment. According to $T_1$, the tracking blind zone where the tracking target is located is determined, and in turn, the target joint point is determined.

At the initial moment, combined with the posture information of the tracking target $Q_1$, relative positional relationship between the tracking target and the target joint point is determined, which can be expressed as a fixed three-dimensional space vector $V_1$. The position information of the target joint point at the initial moment is $T_1-V_1$. The position information of the target joint point at the initial moment is taken as the position information of the target joint point at the current moment, that is, the position information of the target joint point at the current moment is $T_1-V_1$.

The posture information of the tracking target at the initial moment is $Q_1$, the posture information of the tracking target at the current moment is $Q_n$, and the correction amount for the relative positional relationship is determined as $(Q_1^{-1}*Q_n)*$, and in turn, the relative positional relationship information between the target joint point and the tracking target at the current moment is determined as $(Q_1^{-1}*Q_n)*V_1$.

Based on the position information $T_1-V_1$ of the target joint point at the current moment and the relative positional relationship information $(Q_1^{-1}*Q_n)*V_1$ at the current moment, the position information $T_n$ of the tracking target at the current moment is determined as:

$$T_n = T_1 - V_1 + (Q_1^{-1}*Q_n)*V_1.$$

The above technical solution provides a method for determining relative positional relationship information between a target joint point and a tracking target at current moment, which has simple calculation method and easy to implement.

It should be noted that, for the foregoing method embodiments, for the sake of simple description, they are expressed as a series of action combinations, but those skilled in the art should know that the present disclosure is not limited by the order of the actions as described. As, according to the present disclosure, certain steps may be performed in other orders or concurrently. Secondly, those skilled in the art should also know that the embodiments described in the specification belong to preferred embodiments, and the actions and modules involved are not necessarily required by the present disclosure.

Figure 3:
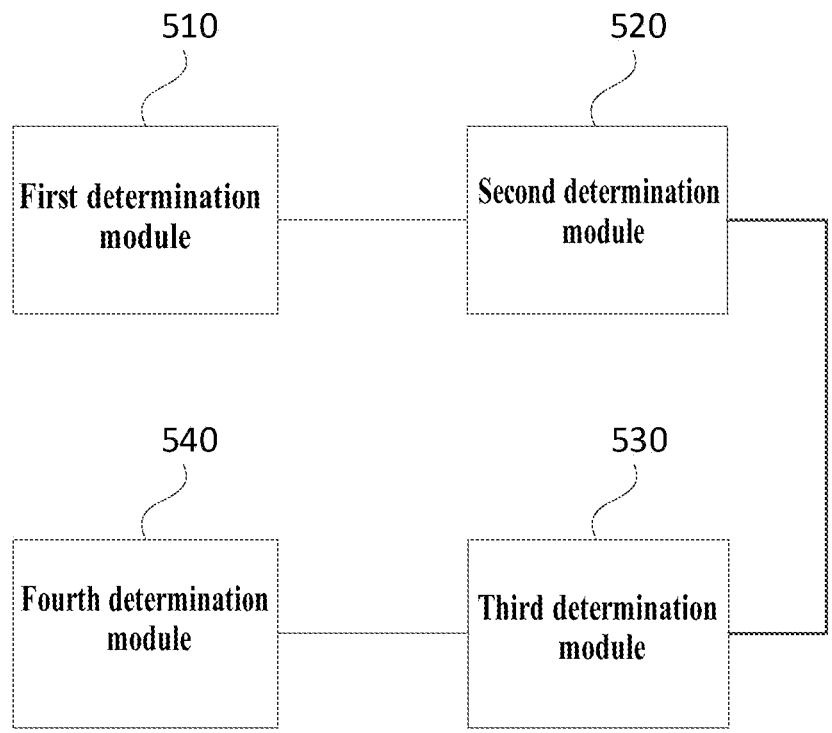
FIG. 3 is a schematic structural diagram of a positioning apparatus in one or more embodiments of the present disclosure.

FIG. 3 is a schematic structural diagram of a positioning apparatus in an embodiment of the present disclosure. The positioning apparatus provided by the embodiments of the present disclosure can be configured in a head-mounted display device. Referring to FIG. 3, the positioning apparatus specifically comprises:

a first determination module 510 configured to determine a target joint point when a tracking target enters a tracking blind zone; the target joint point referring to a joint point in a wearer's body that supports the tracking target to move within the tracking blind zone;

a second determination module 520 configured to determine position information of the target joint point at current moment;

a third determination module 530 configured to determine relative positional relationship information between the target joint point and the tracking target at the current moment; and a fourth determination module 540 configured to determine the position information of the tracking target at the current moment, based on the position information of the target joint point at the current moment and the relative positional relationship information at the current moment.

Further, the first determination module is configured to:
determine a joint point having an association relationship with the tracking blind zone as a target joint point.

Further, if the tracking target is a wearer's hand or a controller held by the hand, and the tracking blind zone is located directly in front of the wearer's head of the head-mounted display device, the joint point having an association relationship with the tracking blind zone is the wrist;

If the tracking target is a wearer's hand or a controller held by the hand, and the tracking blind zone is located behind the side of the wearer's head of the head-mounted display device, the joint point having an association relationship with the tracking blind zone is the elbow.

Further, the second determination module is configured to:
obtain position information of the target joint point at an initial moment; the initial moment being any moment within a preset time period with the moment when the tracking target enters the tracking blind zone as the starting point;
use the position information of the target joint point at the initial moment as the position information of the target joint point at the current moment.

Further, the second determination module is configured to:
obtain position information and posture information of the tracking target at the initial moment;
determine the position information of the target joint point at the initial moment based on the position information and posture information of the tracking target at the initial moment.

Further, the second determination module is configured to:
determine relative position information between the target joint point and the tracking target at the initial moment based on the posture information of the tracking target at the initial moment;
determine the position information of the target joint point at the initial moment based on the position information of the tracking target at the initial moment and the relative position information between the tracking target and the target joint point at the initial moment.

Further, the third determination module is configured to:
obtain posture information of the tracking target at the current moment;
determine a correction amount for the relative positional relationship based on the posture information of the tracking target at the current moment and the posture information of the tracking target at the initial moment;
determine the relative positional relationship information between the target joint point and the tracking target at the current moment based on the correction amount and the relative positional relationship information between the target joint point and the tracking target at the initial moment.

The positioning apparatus provided by the embodiment of the present disclosure can execute the steps in the positioning method provided by the method embodiment of the present disclosure, and has the same or corresponding beneficial effects, which will not be repeated here.

Figure 4:
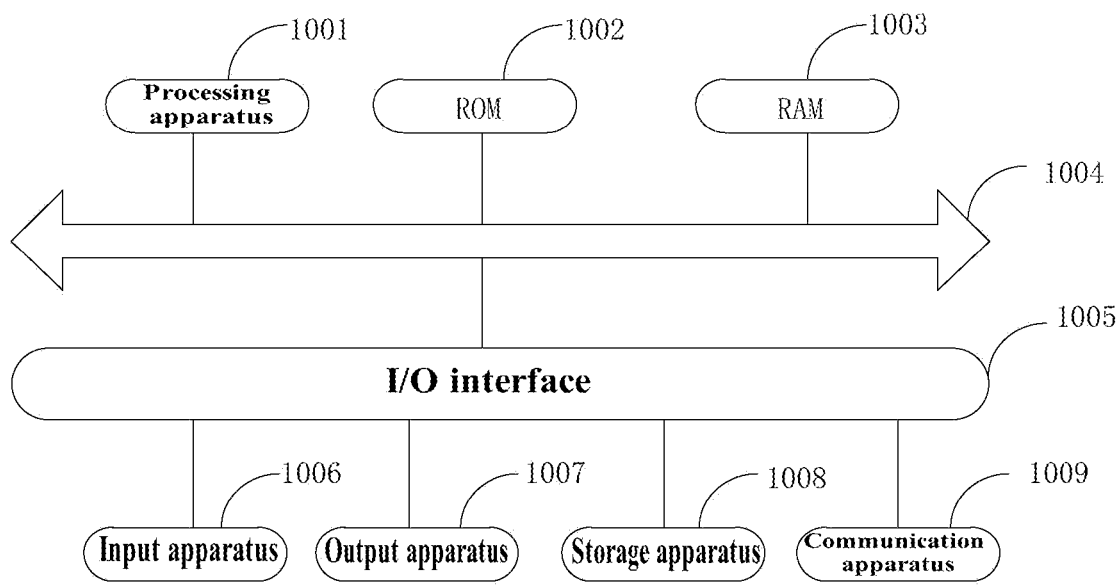
FIG. 4 is a schematic structural diagram of an electronic device in one or more embodiments of the present disclosure.

FIG. 4 is a schematic structural diagram of an electronic device in an embodiment of the present disclosure. Referring specifically to FIG. 4 below, it shows a schematic structural diagram suitable for implementing an electronic device 1000 in an embodiment of the present disclosure. The electronic device 1000 in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), a wearable electronic device, etc. and a fixed terminal such as a digital TV, a desktop computer, a smart home device, etc. The electronic device shown in FIG. 4 is only one example, and should not bring any limitation to functions and usage scopes of the embodiments of the present disclosure.

As shown in FIG. 4, the electronic device 1000 may include a processing apparatus (for example, a central processing unit, a graphics processing unit, etc.) 1001, which can execute various appropriate actions and processes according to a program stored in a read-only memory (ROM) 1002 or a program loaded from a storage apparatus 1008 into a random access memory (RAM) 1003 to implement the positioning method for performance issues of the embodiments as described in the present disclosure. In the RAM 1003, various programs and information necessary for the operation of the electronic device 1000 are also stored. The processing apparatus 1001, ROM 1002, and RAM 1003 are connected to each other through a bus 1004. An input/output (I/O) interface 1005 is also connected to the bus 1004.

Generally, the following apparatus can be connected to the I/O interface 1005: an input device 1006 including, for example, a touch screen, a touchpad, a keyboard, a mouse, a camera, a microphone, an accelerometer, a gyroscope, etc.; an output apparatus 1007 including, for example, a liquid crystal display (LCD), a speaker, a vibrator, etc.; a storage apparatus 1008 including, for example, a magnetic tape, a hard disk, etc.; and a communication apparatus 1009. The communication apparatus 1009 may allow the electronic device 1000 to perform wireless or wired communication with other devices to exchange information. Although FIG. 4 shows an electronic device 1000 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart, thereby realizing the positioning method as described above. In such an embodiment, the computer program may be downloaded and installed from a network via the communication apparatus 1009, or installed from the storage apparatus 1008, or installed from. the ROM 1002. When the computer program is executed by the processing apparatus 1001, the above functions defined in the methods of the embodiments of the present disclosure are executed.

It should be noted that the above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a information signal propagated in a baseband or as a part of a carrier wave, in which a computer-readable program code is carried. This propagated information signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and the server can communicate using any known or future developed network protocols such as HTTP (HyperText Transfer Protocol), and can interconnect with digital information communication (for example, communication network) in any form or medium. Examples of communication networks include local area networks ("LAN"), wide area networks ("WAN"), international network (for example, the Internet), and end-to-end networks (for example, ad hoc end-to-end networks), as well as any known or future developed networks.

The above computer-readable medium may be included in above electronic devices; or it may exist alone without being assembled into the electronic device.

The above computer-readable medium carries one or more programs, which, when executed by the electronic device, cause the electronic device to:
  determine a target joint point when a tracking target enters a tracking blind zone; the target joint point referring to a joint point in a wearer's body that supports the tracking target to move within the tracking blind zone;
  determine position information of the target joint point at current moment;
  determine relative positional relationship information between the target joint point and the tracking target at the current moment; and
  determine the position information of the tracking target at the current moment, based on the position information of the target joint point at the current moment and the relative positional relationship information at the current moment.

In some embodiments, when the above one or more programs are executed by the electronic device, the electronic device may also perform other steps described in the above embodiments.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above maybe performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides an electronic device, comprising:
one or more processors;
a memory for storing one or more programs;
when executed by the one or more processors, the one or more programs cause the one or more processors to implement any one of the positioning methods provided in the present disclosure.

An embodiment of the present disclosure further provides a head-mounted display device, including the above positioning apparatus or the above electronic device.

According to one or more embodiments of the present disclosure, the present disclosure provides a computer-readable storage medium having a computer program stored thereon, which, when executed by a processor, implement anyone of the positioning methods provided in the present disclosure.

An embodiment of the present disclosure further provides a computer program product including a computer program or an instruction, which, when executed by a processor, implement the positioning method as described above.

It should be noted that, here, relative terms such as "first" and "second" are only used to distinguish one entity or operation from another entity or operation, and do not necessarily require or imply any such actual relationship or order between these entities or operations. Furthermore, the term "comprises", "includes" or any other variation thereof is intended to cover a non-exclusive inclusion such that a process, method, article or device comprising a series of elements includes not only those elements, but also includes elements not expressly listed, or elements inherent in such process, method, article, or device. Without further limitations, an element defined by the phrase "comprising one . . . " does not exclude the presence of additional identical elements in the process, method, article or apparatus comprising said element.

The above descriptions are only specific implementation of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments described herein, but is to be accorded the widest scope consistent with the principles and novel features disclosed herein.

What is claimed is:
1. A positioning method, the method is applicable to a head-mounted display device, the method comprising:
determining a target joint point when a tracking target enters a tracking blind zone; the target joint point referring to a joint point in a wearer's body that supports the tracking target to move within the tracking blind zone;
determining position information of the target joint point at current moment;

determining relative positional relationship information between the target joint point and the tracking target at the current moment; and determining the position information of the tracking target at the current moment, based on the position information of the target joint point at the current moment and the relative positional relationship information at the current moment, wherein the determining a target joint point comprises:

determining a joint point having an association relationship with the tracking blind zone as the target joint point.

2. The method according to claim 1, wherein if the tracking target is a wearer's hand or a controller held by the hand, and the tracking blind zone is located directly in front of the head of the wearer of the head-mounted display device, the joint point having an association relationship with the tracking blind zone is the wrist.

3. The method according to claim 1, wherein if the tracking target is a wearer's hand or a controller held by the hand, and the tracking blind zone is located behind the side of the head of the wearer of the head-mounted display device, the joint point having an association relationship with the tracking blind zone is the elbow.

4. The method according to claim 1, wherein the determining the position information of the target joint point at the current moment comprises:

obtaining position information of the target joint point at an initial moment; the initial moment being any moment within a preset time period with the moment when the tracking target enters the tracking blind zone as a starting point;

using the position information of the target joint point at the initial moment as the position information of the target joint point at the current moment.

5. The method according to claim 4, wherein the obtaining the position information of the target joint point at the initial moment comprises:

obtaining position information and posture information of the tracking target at the initial moment;

determining the position information of the target joint point at the initial moment based on the position information and posture information of the tracking target at the initial moment.

6. The method according to claim 5, wherein the determining the position information of the target joint point at the initial moment based on the position information and posture information of the tracking target at the initial moment comprises:

determining relative position information between the target joint point and the tracking target at the initial moment based on the posture information of the tracking target at the initial moment;

determining the position information of the target joint point at the initial moment based on the position information of the tracking target at the initial moment and the relative position information between the tracking target and the target joint point at the initial moment.

7. The method according to claim 6, wherein the determining the relative positional relationship information between the target joint point and the tracking target at the current moment comprises:

obtaining posture information of the tracking target at the current moment;

determining a correction amount for the relative positional relationship based on the posture information of the tracking target at the current moment and the posture information of the tracking target at the initial moment;

determining the relative positional relationship information between the target joint point and the tracking target at the current moment based on the correction amount and the relative positional relationship information between the target joint point and the tracking target at the initial moment.

8. A non-transitory computer-readable storage medium having a computer program stored thereon, when the program is executed by a processor, implement the method according to claim 1.

9. A positioning apparatus, wherein the positioning apparatus is suitable for a head-mounted display device, and the method comprises:

a first determination module configured to determine a target joint point when a tracking target enters a tracking blind zone; the target joint point referring to a joint point in a wearer's body that supports the tracking target to move within the tracking blind zone;

a second determination module configured to determine position information of the target joint point at current moment;

a third determination module configured to determine relative positional relationship information between the target joint point and the tracking target at the current moment; and a fourth determination module configured to determine the position information of the tracking target at the current moment, based on the position information of the target joint point at the current moment and the relative positional relationship information at the current moment, wherein the first determination module is configured to:

determine a joint point having an association relationship with the tracking blind zone as a target joint point.

10. An electronic device, wherein the electronic device comprises:

one or more processors;

a storage for storing one or more programs;

when executed by the one or more processors, the one or more programs cause the one or more processors to implement the following steps:

determining a target joint point when a tracking target enters a tracking blind zone; the target joint point referring to a joint point in a wearer's body that supports the tracking target to move within the tracking blind zone;

determining position information of the target joint point at current moment;

determining relative positional relationship information between the target joint point and the tracking target at the current moment; and determining the position information of the tracking target at the current moment, based on the position information of the target joint point at the current moment and the relative positional relationship information at the current moment, wherein the determining a target joint point comprises:

determining a joint point having an association relationship with the tracking blind zone as the target joint point.

11. A head-mounted display device, comprising the positioning apparatus according to claim 9 or the electronic device according to claim 10.

12. The electronic device according to claim 10, wherein if the tracking target is a wearer's hand or a controller held by the hand, and the tracking blind zone is located directly in front of the head of the wearer of the head-mounted display device, the joint point having an association relationship with the tracking blind zone is the wrist.

13. The electronic device according to claim 10, wherein if the tracking target is a wearer's hand or a controller held by the hand, and the tracking blind zone is located behind the side of the head of the wearer of the head-mounted display device, the joint point having an association relationship with the tracking blind zone is the elbow.

14. The electronic device according to claim 10, wherein the determining the position information of the target joint point at the current moment comprises:
    obtaining position information of the target joint point at an initial moment; the initial moment being any moment within a preset time period with the moment when the tracking target enters the tracking blind zone as a starting point;
    using the position information of the target joint point at the initial moment as the position information of the target joint point at the current moment.

15. The electronic device according to claim 14, wherein the obtaining the position information of the target joint point at the initial moment comprises:
    obtaining position information and posture information of the tracking target at the initial moment;
    determining the position information of the target joint point at the initial moment based on the position information and posture information of the tracking target at the initial moment.

16. The electronic device according to claim 15, wherein the determining the position information of the target joint point at the initial moment based on the position information and posture information of the tracking target at the initial moment comprises:
    determining relative position information between the target joint point and the tracking target at the initial moment based on the posture information of the tracking target at the initial moment;
    determining the position information of the target joint point at the initial moment based on the position information of the tracking target at the initial moment and the relative position information between the tracking target and the target joint point at the initial moment.

17. The electronic device according to claim 16, wherein the determining the relative positional relationship information between the target joint point and the tracking target at the current moment comprises:
    obtaining posture information of the tracking target at the current moment;
    determining a correction amount for the relative positional relationship based on the posture information of the tracking target at the current moment and the posture information of the tracking target at the initial moment;
    determining the relative positional relationship information between the target joint point and the tracking target at the current moment based on the correction amount and the relative positional relationship information between the target joint point and the tracking target at the initial moment.

* * * * *